March 4, 1952     B. J. MURPHY     2,587,751
ADJUSTABLE HEIGHT VEHICLE SEAT
Filed April 30, 1948     2 SHEETS—SHEET 1
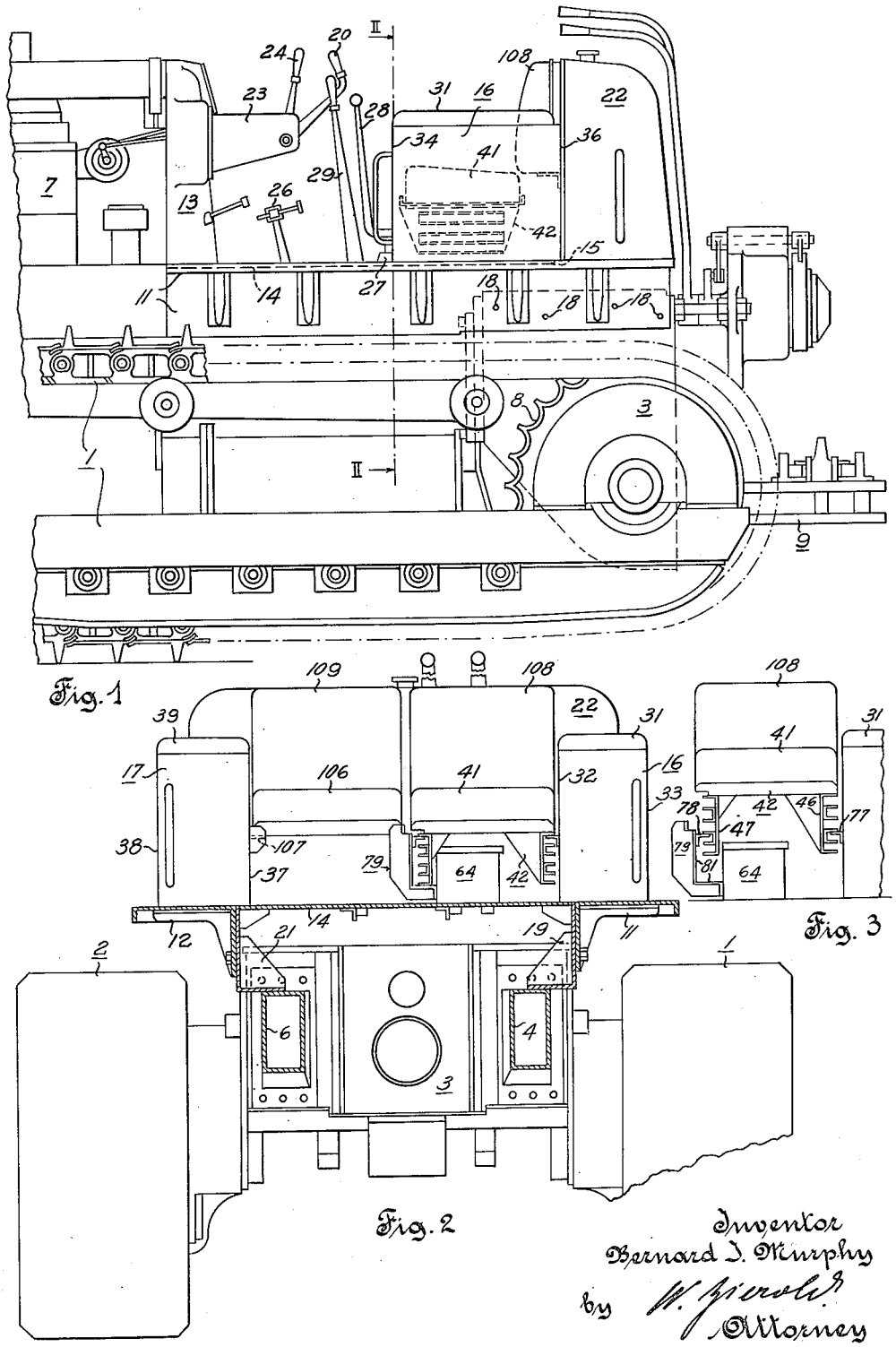

March 4, 1952     B. J. MURPHY     2,587,751
ADJUSTABLE HEIGHT VEHICLE SEAT
Filed April 30, 1948                     2 SHEETS—SHEET 2
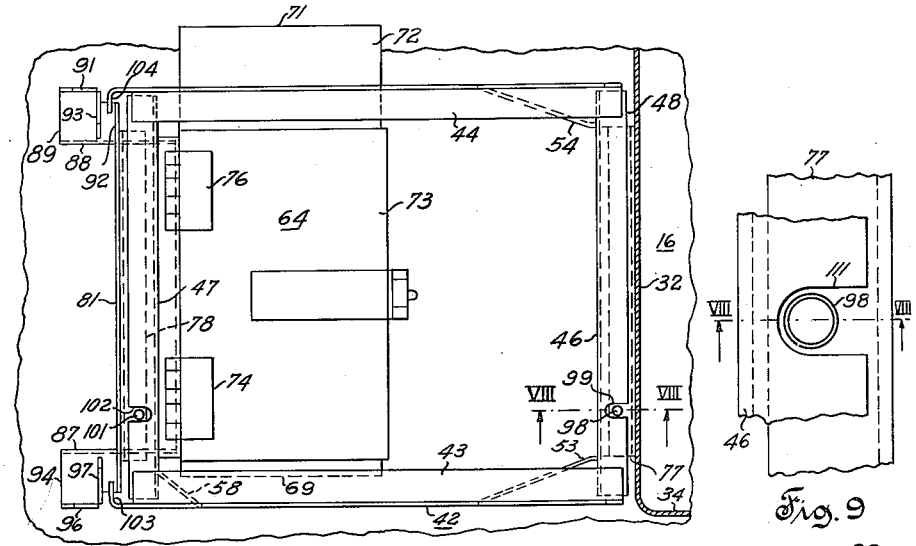
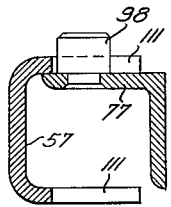
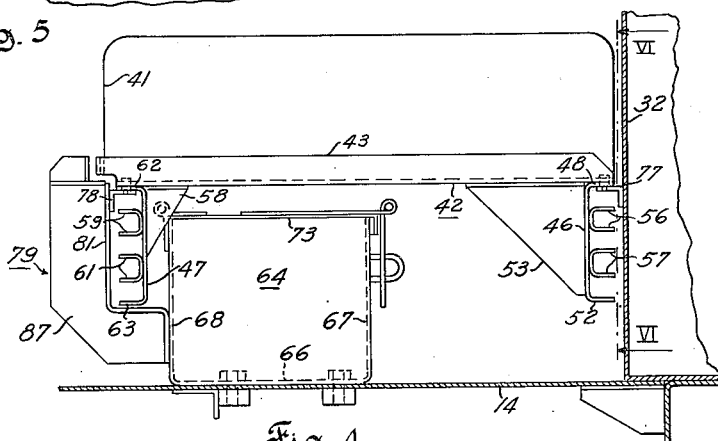
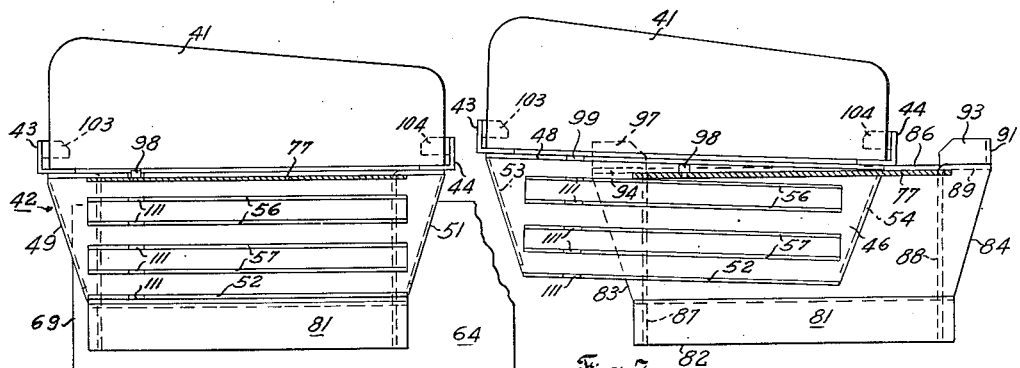
Inventor
Bernard J. Murphy
by
Attorney Patented Mar. 4, 1952

2,587,751

UNITED STATES PATENT OFFICE 2,587,751

ADJUSTABLE HEIGHT VEHICLE SEAT

Bernard J. Murphy, Springfield, Ill., assignor to Allis-Chalmers Manufacturing Company, Milwaukee, Wis., a corporation of Delaware Application April 30, 1948, Serial No. 24,195

9 Claims. (Cl. 296—65)

1

The invention relates to seats, and it is concerned more particularly with a seat assembly in which a part affording a seating surface is adjustable up and down on a mounting base in order to provide for seating of the occupant selectively in raised and lowered positions.

Adjustable seat assemblies of the above mentioned character have heretofore been suggested to provide for height adjustment of the driver's seat in a self-propelled or other vehicle having hand and foot operated controls within reach from the driver's seat, as is well known in the art. The constructions which have heretofore been developed in this connection, particularly for use in passenger automobiles and busses, have been relatively elaborate and expensive, and therefore not well adapted for use in vehicles such as tractors which involve structural and performance features of a special nature and in which simplicity of design, sturdiness of construction and low manufacturing costs are of primary importance.

Generally, it is an object of the invention to provide an improved adjustable height seat adapted for use as a driver's seat in a motor vehicle.

More specifically, it is an object of the invention to provide an improved tractor seat assembly including an adjustable height driver's seat, and which will take care of the requirements of simplicity of design, sturdiness of construction and low manufacturing costs in a practical and fully satisfactory manner.

Another object of the invention is to provide an improved adjustable height seat assembly in conjunction with a storage receptacle, such as a tool box, located below the vertically adjustable seat part.

Another object of the invention is to provide an improved adjustable seat and storage box assembly of the above mentioned character, in which the storage box may be made accessible for placing articles into it and removing them therefrom, in a simple and convenient manner and with a minimum of disturbance of the adjustable seat structure.

A further object of the invention is to provide a reliable, inexpensive locking device which will be readily operable to lock the adjustable seat part upon adjustment thereof to any of a number of predetermined vertical positions, and to release the seat part for adjustment from any one of said predetermined positions to another.

A further object of the invention is to provide an improved seat frame for selective mounting in raised and lowered positions on a pair of horizontally spaced parallel supporting rails, and which seat frame is of simple and sturdy construction and may be manufactured at relatively low costs.

2

These and other objects and advantages are attained by the present invention, various novel features of which will be apparent from the description herein and the accompanying drawings, disclosing an embodiment of the invention, and will be more particularly pointed out in the appended claims.

Referring to the drawings:

Fig. 1 is a side view of the rear half of a crawler tractor;

Fig. 2 is a front view of an operator's compartment shown in Fig. 1, side frame members of the tractor and a deck structure being shown in section on line II—II of Fig. 1, and a vertically adjustable driver's seat at one side of the compartment being shown adjusted to a minimum height.

Fig. 3 is a partial front view similar to Fig. 2 and showing the driver's seat adjusted to an intermediate, raised position.

Fig. 4 is an enlarged front view of a seat and tool box assembly which is mounted on the tractor as shown in Fig. 2.

Fig. 5 is a top view of parts shown in Fig. 4, a seat cushion being omitted for purposes of exposure.

Fig. 6 is a sectional view on line VI—VI of Fig. 4, showing a seat frame in operative position and adjusted to minimum height.

Fig. 7 is a view similar to Fig. 6 and showing the seat frame partly removed from its operative position.

Fig. 8 is an enlarged vertical section of a supporting rail and channel member in cooperative engagement with each other corresponding to Fig. 3, the section being taken in a vertical plane indicated by the line VIII—VIII in Fig. 5.

Fig. 9 is a top view of Fig. 8.

Features of the herein disclosed seat arrangement at the operator's compartment are claimed in a copending application Serial No. 22,879, filed April 23, 1948, by Vander M. Dobeus for Tractor Seat.

In the construction of crawler tractors, it is a customary practice to support a main frame by means of a three-point suspension on a pair of self-laying track units; to mount the engine on a forward part of the main frame; to enclose a power transmitting mechanism, which is operable to vary the drive of the track units, within a relatively large transmission housing which forms a rear part of the main frame; and to provide for control of the tractor from a rearwardly located driver's station on the main frame. The most commonly employed steering principle is that which requires a pair of clutches for interrupting the drive to one or the other of the track units, and a pair of brakes for retarding or arresting the deenergized track unit, as is well known in the art. In tractors which employ this steering principle a pair of manually operable steering levers for controlling the clutches, and a pair of foot levers or pedals for operating the brakes are arranged at the driver's station. A large tank for storing engine fuel is usually mounted at the rear of the driver's station.

The tractor shown in the drawings incorporates the hereinabove outlined general principles of construction and operation. The reference character 1 in Figs. 1 and 2 generally designates a self-laying track unit of the endless track type at the left side of the tractor, and the reference character 2 in Fig. 2 designates a corresponding track unit at the right side of the tractor, the terms "right" and "left" being used in conformity with the orientation of a driver stationed at the rear of the tractor and facing forwardly in the direction of propulsion, that is, toward the left in Fig. 1.

A large transmission housing generally designated in Figs. 1 and 2 by the reference character 3, forms the mentioned rear part of the main frame, and a pair of box section side members 4 and 6 of the main frame are secured at their rear ends to the transmission housing 3 and extend forwardly therefrom at opposite sides of the tractor. An internal combustion engine 7 whose rear end is shown at the left of Fig. 1, is mounted at the forward end of the tractor between the side frame members 4 and 6 and in forwardly spaced relation to the transmission housing 3. A track belt drive sprocket 8 for the left track unit 1, and a corresponding track belt drive sprocket (not shown) for the right track unit 2, are rotatably mounted at opposite sides, respectively, of the transmission housing 3, and are connected through suitable power transmitting mechanism, not shown, in driven relation with the engine 7. The usual steering clutches and steering brakes, not shown, are enclosed in the transmission housing 3. A drawbar structure 9 for hitching a trailing vehicle to the tractor is attached to the main frame in the customary manner and extends rearwardly beyond the transmission housing 3, as shown in Fig. 1.

A top structure rearwardly of the engine 7 comprises a pair of fenders 11, 12 (Fig. 2), a dash panel 13 (Fig. 1), a horizontal plate metal floor 14, a pair of battery boxes 16 and 17 (Fig. 2) at opposite sides of the tractor, a fuel tank 22 bridging the fenders in rear of the battery boxes, and a seat assembly to be described more fully hereinbelow and which is arranged between the battery boxes 16 and 17 and forwardly of the fuel tank 22.

The left fender 11 has a vertical, substantially rectangular vertical wall part (Figs. 1 and 2) and a horizontal wall part which extends outwardly over the track unit 1. The fender 11 is secured at a rear portion of its vertical wall part to the left side of the transmission housing 3 by means of bolts 18, and it is supported on the left side member 4 of the main frame by means of a reinforced angle bracket 19 (Fig. 2) which is secured to a forward portion of the vertical wall part of the fender 11 and to the top of the side frame member 4. The right fender 12 is an opposite hand duplicate of the fender 11, and the foregoing explanations with respect to the construction and mounting of the fender 11 analogously apply to the fender 12. Fig. 2 shows a reinforced angle bracket 21 which corresponds to the angle bracket 19, and which connects a forward portion of the vertical wall part of the fender 12 with the side frame member 6.

The dash panel 13 is mounted on the floor 14 which in turn is secured at its opposite sides to the fenders 11 and 12, and which extends in the same horizontal plane as the horizontal wall parts of the fenders. The floor 14 covers the full width between the fenders, forwardly of the fuel tank 22 and terminates in a straight transverse rear edge 15 (Fig. 1) in proximity to the forward vertical wall of the fuel tank.

A left hand steering lever 20 (Fig. 1), and a corresponding right hand steering lever, not shown, for operating the steering clutches of the tractor, are pivotally mounted on a bracket 23 which is secured to the dash panel 13 and extends rearwardly therefrom, as shown in Fig. 1. Also mounted on the bracket 23 is a throttle control lever 24 which is pivotally adjustable about the same axis as the steering levers.

Features of the herein disclosed steering lever arrangement are claimed in U. S. Patent 2,533,872 granted on December 12, 1950, to A. C. Boock et al. for Tractor Control Mechanism.

A left brake pedal 26, and a right brake pedal, not shown, are mounted on the tractor in upwardly projecting relation to the floor 14 and are operable in the usual manner to apply and release the steering brakes of the tractor.

The floor 14 has a central cutout to accommodate a mounting base 27 for a gear shift lever 28 and another cutout at the left side of the tractor to accommodate a master clutch actuating lever 29.

The assembly of the fenders 11, 12 and of the floor 14 forms a horizontal operator's platform rearwardly of the engine 7 and forwardly of the fuel tank 22. The battery box 16 is secured in fixed position on top of the fender 11 and has a padded lid 31 (Fig. 2) to close a top opening of the battery box, the sides of the box being formed by longitudinal vertical side walls 32 and 33 (Fig. 2) and by transverse front and rear walls 34 and 36 (Fig. 1). The battery box 17 is a duplicate of the battery box 16 and is mounted on top of the fender 12, the longitudinal side walls of the battery box 17 being designated by the reference characters 37 and 38 in Fig. 2, and its front and rear walls being transversely aligned, respectively, with those of the battery box 16. The top opening of the battery box 17 is closed by a padded lid 39 (Fig. 2) which, like the padded lid 31 of the battery box 16, is removable to afford access to the interior of the box.

The seat assembly which, as stated, is arranged between the battery boxes 16 and 17, comprises a driver's section at the left side of the tractor and directly behind the steering levers and brake pedals, and a companion's section at the right side of the tractor and adjacent to the battery box 17, as best shown in Fig. 2. The driver's section includes a seat cushion 41, and a vertically adjustable supporting frame therefor which is generally designated in Figs. 1, 2 and 3 by the reference character 42, and which is constructed as shown in fuller detail in Figs. 4 to 6. The seat cushion 41 comprises a rigid, rectangular upholstery frame, not shown, and the width of the seat cushion, transversely of the tractor, is somewhat less than one-half of the distance between the relatively opposed sidewalls 32 and 37 of the battery boxes 16 and 17, respectively. The depth of the seat cushion 41, longitudinally of the tractor, is somewhat less than the length of the battery box 16, the rear edge of the seat cushion being spaced forwardly from the front wall of the fuel tank 22, and the front edge of the seat cushion being spaced a short distance rearwardly from the front wall 34 of the battery box 16, as shown in Fig. 1.

Referring to Figs. 4 and 5, the seat frame 42 comprises a front cross member in the form of an angle iron 43, a rear cross member in the form of an angle iron 44, and a pair of side plate members 46 and 47, the cross and side members being rigidly secured together so that one flange of each of the angle irons 43 and 44 extends within and the other extends upwardly from a horizontal plane, and so that the side plate members 46 and 47 extend downwardly from said plane and between the angle irons 43 and 44 in transversely spaced parallel relation to each other. As shown in Figs. 6 and 7, each of the angle irons 43 and 44 presents a vertical outer flange side and a horizontal flange side which extends inwardly from the lower end of the vertical flange side. This arrangement of the angle irons provides for vertical support of the seat cushion 41 on the horizontal flanges and limits fore and aft displacement of the seat cushion 41 relative to the seat frame 42 by the vertical flanges of the angle irons. The side plate member 46 has an upper horizontal flange 48 which extends below the horizontal flanges of the angle irons 43 and 44 and is secured thereto by welding. A vertical, depending part of the plate member 46 has a forwardly and upwardly inclined front edge 49 (Fig. 6), a rearwardly and upwardly inclined rear edge 51, and a horizontal bottom flange 52. A gusset plate 53 connects the front edge 49 of the plate member 46 with the underside of the front angle iron 43, and a similar gusset plate 54 (Fig. 5) connects the rear edge 51 of the plate member 46 with the underside of the rear angle iron 44.

A channel member 56 which is formed independently of the plate member 46 is placed with its web portion against the outer side of the plate 46 and welded thereto so as to extend parallel to and below the top flange 48 at a predetermined distance from the latter, and which distance is equal to the spacing between the top and bottom flanges of the channel 56. Another channel member 57, which is a duplicate of the channel member 56, is similarly secured to the outer side of the plate member 46 so as to extend parallel to and below the channel 56 at a vertical distance therefrom which is equal to the vertical spacing between its own top and bottom flanges and those of the channel 56. The bottom flange 52 of the side member 46 is vertically spaced from the bottom flange of the channel 57 a distance which is equal to the spacing between the top and bottom flanges of each of the channels 56 and 57.

The side plate member 47 at the other side of the seat frame 42 is substantially an opposite hand duplicate of the side plate member 46, the top flange of the side member 47 underlying the horizontal flanges of the front and rear angle irons 43 and 44 and being secured thereto by welding. A gusset plate 58, corresponding to the gusset plate 53, but of smaller size than the latter, connects the side plate member 47 at its forward end with the underside of the front cross member 43. For purposes which will appear hereinbelow, the connection between the rear angle iron 44 and the side plate member 47 is not reinforced by a gusset plate such as the gusset plate 54 which connects the side plate member 46 at its rear end with the angle iron 44. A pair of channel members 59 and 61 which correspond to the channel members 56 and 57, respectively, are secured to the outer side of the side plate member 47 in the same manner as has been explained hereinbefore in connection with the channels 56 and 57. The side plate member 47 has a top flange in the same horizontal plane as the top flange 48 of the side member 46, and a bottom flange 63 in the same horizontal plane as the bottom flange 52 of the side member 46. The flanges of the channels 56 and 57 are similarly aligned horizontally with the flanges of the channels 59 and 61, as best shown in Fig. 4.

A rectangular tool box 64 is rigidly secured to the floor 14 below the seat frame 42, as best shown in Figs. 4 and 5, and comprises a rectangular bottom wall 66 which extends longitudinally of the tractor, opposite side walls 67 and 68, front and rear walls 69 and 71 and a fixed top wall section 72 which partly covers the top of the tool box at the rear end of the latter. The remaining top part of the tool box 64 is covered by a lid 73 which is hinged to the side wall 68 by a pair of hinges 74 and 76, as indicated in Fig. 5.

The seat frame 42, as shown in Fig. 4, is supported at its opposite sides on a pair of horizontal supporting rails in the form of angle irons 77 and 78. The angle iron 77 is welded to the side wall 32 of the battery box 16 at a predetermined horizontal distance from the floor 14 and extends horizontally parallel to the latter. The other angle iron 78 is mounted in confronting relation to the angle iron 77 on a support, which is generally indicated by the reference character 79, and which is constructed as follows:

A heavy gauge sheet metal plate 81 which forms part of the support 79 extends longitudinally of the tractor in an upright position and has a straight vertical base part which is welded to the side wall 68 of the tool box 64, and a straight vertical web part which is offset from the base part toward the battery box 17. The base part of the plate 81 has a straight horizontal bottom edge 82 (Fig. 7), and the web part has a forwardly and upwardly inclined front edge 83, an upwardly and rearwardly inclined rear edge 84, and a straight horizontal top edge 86 (Fig. 7). The plate 81 is reinforced at the side thereof which faces the battery box 17, by a plate metal bracket 87 adjacent to the forward end of the plate 81, and by another plate metal bracket 88 adjacent to the rear end of the plate 81.

The rear bracket 88 (Figs. 5 and 7) is set on edge against the base and web parts of the plate 81 and secured thereto by welding. At its upper end the bracket 88 has a wing portion 89 which is bent rearwardly to extend in a horizontal plane and at the side of the plate 81 which faces the battery box 17, and a rear part of the wing portion 89 is bent upwardly to form a rear stop 91 in a vertical plane at right angles to the plate 81 and at the side of the latter which faces the battery box 17. An edge portion 92 (Fig. 5) of the wing 89 is welded to the top edge 86 of the plate 81, and a vertical plate part 93 on top of the wing 89 is welded at its bottom edge to the latter and at its rear edge to the stop 91, the plate part 93 forming a side stop in a vertical plane parallel to the plate 81 and at the side of the latter which faces the battery box 17.

The foregoing explanations with respect to the construction and mounting of the rear bracket 88 similarly apply to the front bracket 87 which is an opposite hand duplicate of the bracket 88. That is, the front bracket 87 has a horizontally and forwardly extending wing part 94 (Fig. 5) and a front stop 96 which correspond, respectively, to the wing part 89 and rear stop 91 of the bracket 88, and a side stop 97 is secured to the wing part 94 and extends in the same vertical longitudinal plane as the side stop 93.

The angle iron 78 is welded to the web part of the plate 81 and extends parallel to the horizontal top edge 86 of the latter, one flange of the angle iron 78 forming an elongated horizontal shelf at a short distance below the top edge 86. The angle iron 78 is of the same length as the other angle iron 77 on the battery box 16, and the horizontal flanges of the angle irons extend in a common horizontal plane at a predetermined height above the floor 14.

As shown in Figs. 4 and 5, a dowel pin 98 is riveted to the horizontal flange of the angle iron 77 and extends upwardly, at a short distance rearwardly from the forward end of the angle iron 77, into a vertical aperture or notch 99 of the upper flange 48 of the seat frame 42. A similar dowel pin 101 is secured to the angle iron 78 and extends upwardly into a notch 102 of the upper flange 62 of the seat frame 42.

The upholstery frame of the seat cushion 41 rests at its forward and rearward edges on the horizontal flanges of the front and rear angle irons 43 and 44, respectively, and is restrained against back and forth movement longitudinally of the tractor by engagement with the vertical flanges of the front and rear angle irons 43 and 44, respectively. Sidewise shifting movement of the seat cushion 41, transversely of the tractor, is limited by the vertical wall 32 of the battery box 16 and by a pair of lugs 103 and 104 which are integrally formed with the vertical flanges of the angle irons 43 and 44 at the ends of the latter adjacent to the bracket 79. The seat cushion 41 may readily be placed into its operatively installed position on top of the seat frame 42, and in order to remove the seat cushion 41 it is only necessary to lift it from the angle irons 43 and 44.

Referring to Fig. 5, in which the seat cushion 41 has been omitted, it will be noted that the space between the angle irons 43 and 44 and between the top flanges of the side members 46 and 47 provides a large top aperture of the seat frame 42 through which the tool box 64 is accessible after the seat cushion 41 has been removed from the seat frame 42. The lid 73 of the tool box is so dimensioned in proportion to the top aperture of the seat frame 42 that said aperture will accommodate upward swinging movement of the lid 73 from a closed to an open position while the seat frame is sustained on the angle irons 77 and 78 in its lowest position, as shown in Fig. 4, and in any other vertical position to which the seat frame may be adjusted as will be explained hereinbelow.

The companion's section of the seat assembly, as shown in Fig. 2, comprises a seat cushion 106, which is a duplicate of the seat cushion 41, and which is mounted independently of the driver's seat in an operative position between the bracket 79 and the right battery box 17 at a predetermined height above the floor 14. A horizontal supporting strip 107 with suitable end stops is welded to the side wall 37 of the battery box 17, and the upholstery frame of the seat cushion 106 is supported at its front and rear corners, adjacent to the support 79, on the horizontal wings 94 and 89 of the brackets 88 and 87, respectively, and the edge of the upholstery frame of the seat cushion 106, adjacent to the battery box 17, rests on the horizontal supporting strip 107.

A back rest 108 for the driver, and a back rest 109 for the companion, are mounted at the left and right sides, respectively, of the tractor on the vertical front wall of the fuel tank 22.

In order to operate the tractor, a driver may place himself on the seat cushion 41 and manipulate the steering levers, brake pedals and other controls of the tractor in the usual manner. A companion whose presence may be desired under certain conditions, for instance when the tractor is used for snow plow work, may place himself on the seat cushion 106. The padded lids 31 and 39 serve as arm rests for the driver and the companion, respectively.

For convenient manipulation of the tractor controls, or if the tractor is used in conjunction with allied equipment such as a self-loading scraper in the rear or a bulldozer or the like in front, the driver may find it desirable to be in a higher position than the one which the driver's affords in the condition in which it is shown in Fig. 2. A desired height adjustment of the driver's position may readily and properly be taken care of by the herein disclosed adjustable arrangement of the driver's seat which permits adjustment of the seat frame 42 to six different height positions relative to the floor 14. In Fig. 2 the seat frame is shown in its first or lowest height position, and in Fig. 3 the seat frame is shown in its fourth height position. Fig. 7 illustrates a preparatory step for adjusting the seat frame 42 from its lowest to a higher position. Referring to Figs. 6 and 7, by taking hold of the front angle iron 43 of the seat frame, in Fig. 6, the driver may lift it upwardly a short distance so as to disengage the notches 99 and 102 of the top flanges 48 and 62 from the dowel pins 98 and 101, and he may then pull the seat frame forwardly, as indicated in Fig. 7. While pulling the seat frame 42 forwardly, the top flanges 48 and 62 will ride on top of the dowel pins 98 and 101, and there is sufficient space in front of the operator's compartment to permit the seat frame to be pulled out entirely from the space between the angle irons 77 and 78. The tool box 64 does not interfere with such forward movement of the seat frame 42, the latter being suitably constructed at its rear end, as explained hereinbefore, to clear the tool box. After the seat frame has been pulled out in the described manner, it may then be reinserted in any desired elevated position, by engaging a suitable pair of the horizontal side flanges of the depending side members 46 and 47 with the angle irons 77 and 78, respectively. Notches 111 (Fig. 7) corresponding to the notch 99 are formed in each of the horizontal flanges below the top flange 48, and each of the horizontal flanges below the top flange 62 at the other side of the seat frame has a notch corresponding to the notch 102 in the top flange 62. The notches 111 are vertically aligned with the notch 99, as shown in Fig. 7, and the corresponding notches at the other side of the seat frame are similarly aligned vertically with the notch 102. When the seat frame has been engaged in the desired elevated position with the angle irons 77 and 78, it may be pushed back until the notches at the opposite sides of the seat frame align with the dowel pins 98 and 101, respectively, whereupon the seat frame will slightly drop and become locked against back and forth movement relative to the angle irons 77 and 78.

The driver's seat may thus be adjusted to any one of the mentioned six vertical positions relative to the floor 14, independently of the companion's seat 106. The tool box 64 may be made readily accessible in any selected vertical position of the seat frame 42, and without disturbing the locked engagement of the seat frame with the dowel pins 99 and 102, by merely removing the seat cushion 41 from the seat frame 42.

In general terms, the tool box 64 forms a storage receptacle which is mounted on the platform 14 in upwardly projecting relation thereto, and the angle irons 77 and 78 form a pair of horizontally spaced supporting rails which are mounted at opposite sides, respectively, of said receptacle in elevated relation to the platform. The seat frame has front and rear cross members 43 and 44 and vertical side plate members 46 and 47 which are rigidly secured together so as to define a top aperture between said front and rear cross members and a transverse space therebelow between said side members. The opposite side members 46 and 47 have horizontal flange members which are cooperable with the supporting rails 77 and 78 to sustain the seat frame in straddling relation to the receptacle 64 and selectively at different heights above the platform. The seat cushion 41 forms a seat member which is detachably mounted on the seat frame in overlying relation to the mentioned top aperture of the latter, and the channel members 56, 57, 59 and 61 form horizontal guideways adapted to receive the supporting rails 77 and 78, in the manner and for the purposes described hereinbefore.

Flange engaging sides of the supporting rails 77 and 78 may be selectively engaged either by rail engaging sides, respectively, of upper supporting flanges of the seat frame for sustaining the latter in a lowered position, or by rail engaging sides, respectively, of lower supporting flanges of the seat frame for sustaining the latter in a raised position. By way of example, the flange 48 and the top flange of the channel 56 represent first upper and lower supporting flanges, the flange 62 and the top flange of the channel 59 represent second upper and lower supporting flanges, and the angle irons 77 and 78 represent first and second supporting rails, respectively. The mentioned first flanges have vertical apertures, namely the notch 99 in the upper flange 48 and the notch 111 in the top flange of the channel 56, which are selectively engageable with a dowel element 98 secured to the first supporting rail 77 and extending vertically from the flange engaging side thereof, and the vertical spacings of the mentioned lower flanges from the overlying upper flanges, that is the spacings of the top flanges of the channels 56, 59 from the overlying flanges 48, 62, are so proportioned relative to the supporting rails 77, 78 and dowel element 98 as to permit engagement of said dowel element with and disengagement thereof from the vertical aperture 99 of the first supporting flange 48 by lowering and raising movements, respectively, of the seat frame into and out of the lowered position in which it is shown in Fig. 4.

From another point of view, the bottom flanges of the channels 56 and 59 may be considered as the lower flanges, and the top flanges of the channels 56, 59 may be considered as intermediate flanges. Under these assumptions, the seat frame comprises first upper, intermediate and lower supporting flanges connected with the side member 46, and second upper, intermediate and lower supporting flanges connected with the side member 47, so that the first and second supporting rails 77, 78 may be selectively engaged with said upper flanges, namely the flanges 48, 62, respectively, for sustaining the seat frame in a lowered position; or with said intermediate flanges, namely the top flanges of the channels 56, 59, respectively, for sustaining the seat frame in an intermediate position; or with said lower flanges, namely the bottom flanges of the channels 56, 59, respectively, for sustaining the seat frame in a raised position. The first flanges, that is the flange 48 and the top and bottom flanges of the channel 56, have vertical apertures for selective engagement with the dowel element 98, and the intermediate flanges, that is the top flanges of the channels 56, 59, are vertically spaced from the overlying upper and from the underlying lower flanges so as to permit engagement of the dowel element 98 with and disengagement thereof from the aperture 99 of the first upper flange 48 by lowering and raising movements, respectively, of the seat frame into and out of its lowered position, and so as to permit engagement of the dowel element 98 with and disengagement thereof from the aperture 111 of the first intermediate flange, that is the top flange of the channel 56, by lowering and raising movements, respectively, of the seat frame into and out of said intermediate position thereof.

It should be understood that it is not intended to limit the invention to the hereinabove described forms and details, and that the invention includes such other forms and modifications as are embraced by the scope of the appended claims.

It is claimed and desired to secure by Letters Patent:

1. A seat frame for selective mounting in raised and lowered positions on a pair of horizontally spaced parallel supporting rails, comprising a pair of front and rear angle irons and a pair of side plate members rigidly secured together so that one flange of each of said angle irons extends within and the other flange of each of said angle irons extends upwardly from a horizontal plane, and so that said side plate members extend downwardly from said plane and between said angle irons in transversely spaced parallel relation to each other, and channel members formed separately of said side plate members and secured thereto at their web portions so as to extend parallel to said horizontal plane, said channel members being adapted, respectively, to sustain said seat frame in said raised and lowered positions on said supporting rails.

2. A seat frame as set forth in claim 1, in which a plurality of said channel members are secured to each of said side plate members in vertically spaced relation to each other.

3. In a tractor having an operator's platform and vertical side members of a seat compartment, mounted on said platform to extend longitudinally of the tractor at opposite sides thereof, the combination of, a receptacle of lower height than said side members, mounted at one side of the tractor between said side members and in transversely spaced relation to the latter, a horizontal seat supporting rail secured above said platform to the side member at said one side of the tractor and in confronting relation to the other side member, a bracket structure secured to said receptacle and having an upstanding part laterally offset from said receptacle toward said other side member, another horizontal seat supporting rail secured to said upstanding part of said bracket structure in confronting relation to said first mentioned supporting rail, a driver's seat mounted on said supporting rails in overlying relation to said receptacle for selective adjustment to raised and lowered positions, and a companion's seat operatively supported at opposite sides thereof on said upstanding part of said bracket structure and on said other side member, respectively.

4. An adjustable height seat assembly comprising, relatively cooperable seat and base structures, one having a pair of horizontal supporting rails extending parallel to each other at opposite sides thereof, and the other having vertically extended side portions in laterally confronting relation to said supporting rails, respectively, a set of channel members formed separately of said seat and base members and secured at their web portions to one of said vertically extending side portions in parallel vertically spaced relation to each other, and another set of channel members formed separately of said seat and base members and secured at their web portions to the other of said vertically extending side portions in parallel vertically spaced relation to each other, each of said first mentioned set of channel members forming a horizontal guideway adapted to receive the supporting rail adjacent to said one side member, and each of said second mentioned set of channel members forming a horizontal guideway adapted to receive the supporting rail adjacent to said other side member.

5. An adjustable height seat assembly as set forth in claim 4, in which the flanges of each set of channel members are spaced substantially equal vertical distances from each other.

6. A seat frame for selective mounting in raised and lowered positions on first and second horizontally spaced parallel supporting rails comprising, in combination, a pair of vertical side members, means rigidly securing said side members in parallel relation to each other, first upper and lower supporting flanges connected with one of said side members, and second upper and lower supporting flanges connected with the other of said side members, so that said supporting rails may be selectively engaged either with said upper flanges, respectively, for sustaining said seat frame in said lowered position, or with said lower flanges, respectively, for sustaining said seat frame in said raised position, said first flanges having vertical apertures for selective engagement with a dowel element projecting upwardly from said first supporting rail, and said lower flanges being vertically spaced from the overlying upper flanges so as to permit engagement of said dowel element with and disengagement thereof from said aperture of said first upper flange by lowering and raising movements, respectively, of said seat frame into and out of said lowered position thereof.

7. A seat frame for selective mounting in raised, intermediate and lowered position on first and second horizontally spaced parallel supporting rails comprising, in combination, a pair of vertical side members, means rigidly securing said side members in parallel relation to each other, first upper, intermediate and lower supporting flanges connected with one of said side members, and second upper, intermediate and lower supporting flanges connected with the other of said side members, so that said supporting rails may be selectively engaged with said upper flanges, respectively, for sustaining said seat frame in said lowered position, or with said intermediate flanges, respectively, for sustaining said seat frame in said intermediate position, or with said lower flanges, respectively, for sustaining said seat frame in said raised position; said first flanges having vertical apertures for selective engagement with a dowel element projecting upwardly from said first supporting rail, and said intermediate flanges being vertically spaced from the overlying upper and from the underlying lower flanges so as to permit engagement of said dowel element with and disengagement thereof from said aperture of said first upper flange by lowering and raising movements, respectively, of said seat frame into and out of said lowered position thereof, and so as to permit engagement of said dowel element with and disengagement thereof from said aperture of said first intermediate flange by lowering and raising movements, respectively, of said seat frame into and out of said intermediate position thereof.

8. A seat frame as set forth in claim 7, in which said vertical apertures of said first upper, intermediate and lower supporting flanges are vertically aligned with each other.

9. An adjustable height seat assembly comprising, in combination, relatively cooperable seat and base structures, one having first and second horizontal supporting rails extending parallel to each other at opposite sides thereof, and the other having vertical side portions in laterally confronting relation to said supporting rails, first upper and lower supporting flanges connected with one of said side portions, and second upper and lower supporting flanges connected with the other of said side portions so that flange engaging sides of said supporting rails may be selectively engaged either by rail engaging sides, respectively, of one pair of said first and second flanges for sustaining said seat structure in a lowered position, or by rail engaging sides, respectively, of the other pair of said first and second flanges for sustaining said seat structure in a raised position; and a dowel element secured to said first supporting rail and extending vertically from said flange engaging side thereof, said first flanges having vertical apertures selectively engageable with said dowel element upon adjustment of said seat structure to said lowered and raised positions thereof, and the vertical spacings of said lower flanges from the overlying upper flanges being so proportioned relative to said supporting rails and dowel element as to permit engagement of said dowel element with and disengagement thereof from the vertical aperture of the first supporting flange of said one pair by lowering and raising movements, respectively, of said seat structure into and out of said lowered position thereof.

BERNARD J. MURPHY.

REFERENCES CITED

The following references are of record in the file of this patent:

UNITED STATES PATENTS

| Number | Name | Date |
|---|---|---|
| 1,065,280 | Stanger et al. | June 17, 1913 |
| 1,356,558 | Purcell | Oct. 26, 1920 |
| 1,404,484 | Schoonmaker | Jan. 24, 1922 |
| 1,689,765 | Baxter | Oct. 30, 1928 |
| 1,812,067 | Toncray | June 30, 1931 |
| 1,834,817 | Woodfin | Dec. 1, 1931 |
| 2,010,052 | Baker et al. | Aug. 6, 1935 |
| 2,280,882 | Austin | Apr. 28, 1942 |
| 2,427,234 | Shepherd | Sept. 9, 1947 |